(12) United States Patent
Jensen (10) Patent No.: US 7,871,111 B2
(45) Date of Patent: Jan. 18, 2011

(54) METHOD AND APPARATUS FOR REPAIRING A FLAWED WELDED JOINT IN A CORE SPRAY PIPING SYSTEM

(75) Inventor: Grant Clark Jensen, Morgan Hill, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 359 days.

(21) Appl. No.: 12/219,035

(22) Filed: Jul. 15, 2008

(65) Prior Publication Data

US 2010/0013221 A1 Jan. 21, 2010

(51) Int. Cl.
*F16L 21/00* (2006.01)

(52) U.S. Cl. .......................... 285/419; 285/15; 285/81

(58) Field of Classification Search ................. 285/419, 285/373, 81, 92, 82, 192, 201, 189
See application file for complete search history.

(56) References Cited

U.S. PATENT DOCUMENTS

| | | | | |
|---|---|---|---|---|
| 5,188,397 A | * | 2/1993 | Hynes | 285/24 |
| 5,375,888 A | * | 12/1994 | Ikeda | 285/15 |
| 5,839,192 A | * | 11/1998 | Weems et al. | 29/890.031 |
| 5,964,029 A | * | 10/1999 | Weems et al. | 29/723 |
| 6,053,652 A | * | 4/2000 | Deaver et al. | 403/24 |
| 6,086,120 A | * | 7/2000 | Deaver et al. | 285/421 |
| 6,108,391 A | * | 8/2000 | Deaver et al. | 376/262 |
| 6,347,663 B1 | * | 2/2002 | Hunzinger et al. | 165/178 |
| 6,375,230 B1 | * | 4/2002 | Jensen et al. | 285/104 |
| 6,456,682 B1 | * | 9/2002 | Jensen | 376/282 |
| 6,647,083 B1 | * | 11/2003 | Jensen | 376/286 |
| 6,857,814 B2 | * | 2/2005 | Jensen | 403/374.3 |
| 7,185,798 B2 | * | 3/2007 | Butler | 228/44.5 |
| 7,272,204 B2 | * | 9/2007 | Jensen | 376/260 |
| 7,617,963 B1 | * | 11/2009 | Jensen | 228/44.5 |

\* cited by examiner

*Primary Examiner*—Aaron Dunwoody
(74) *Attorney, Agent, or Firm*—Nixon & Vanderhye P.C.

(57) ABSTRACT

A clamp is disclosed which structurally replaces a cracked P3*a* weld in the piping of a BWRi's core spray line. The clamp includes upper and lower clamp bodies that are joined together by clamp bolts held by keeper nuts with crimp collars engaging the bolts. Upper and lower curved jaws of the clamp bodies contact the piping at a plurality of contact points to form gaps between the piping and curved jaws to thereby ensure that the clamp engages the piping and seals the cracked weld. Conically shaped ends of stop bolts inserted into the upper curved jaw seat into conical holes machined in the core spray line piping to prevent the piping cracked weld from separating after the clamp is installed.

20 Claims, 11 Drawing Sheets

METHOD AND APPARATUS FOR REPAIRING A FLAWED WELDED JOINT IN A CORE SPRAY PIPING SYSTEM

The present invention relates to boiling water reactors ("BWR") in nuclear power plants, and more particularly, to a method and apparatus for repairing a flawed welded joint in a BWR core spray piping system.

BACKGROUND OF THE INVENTION

Figure 1:
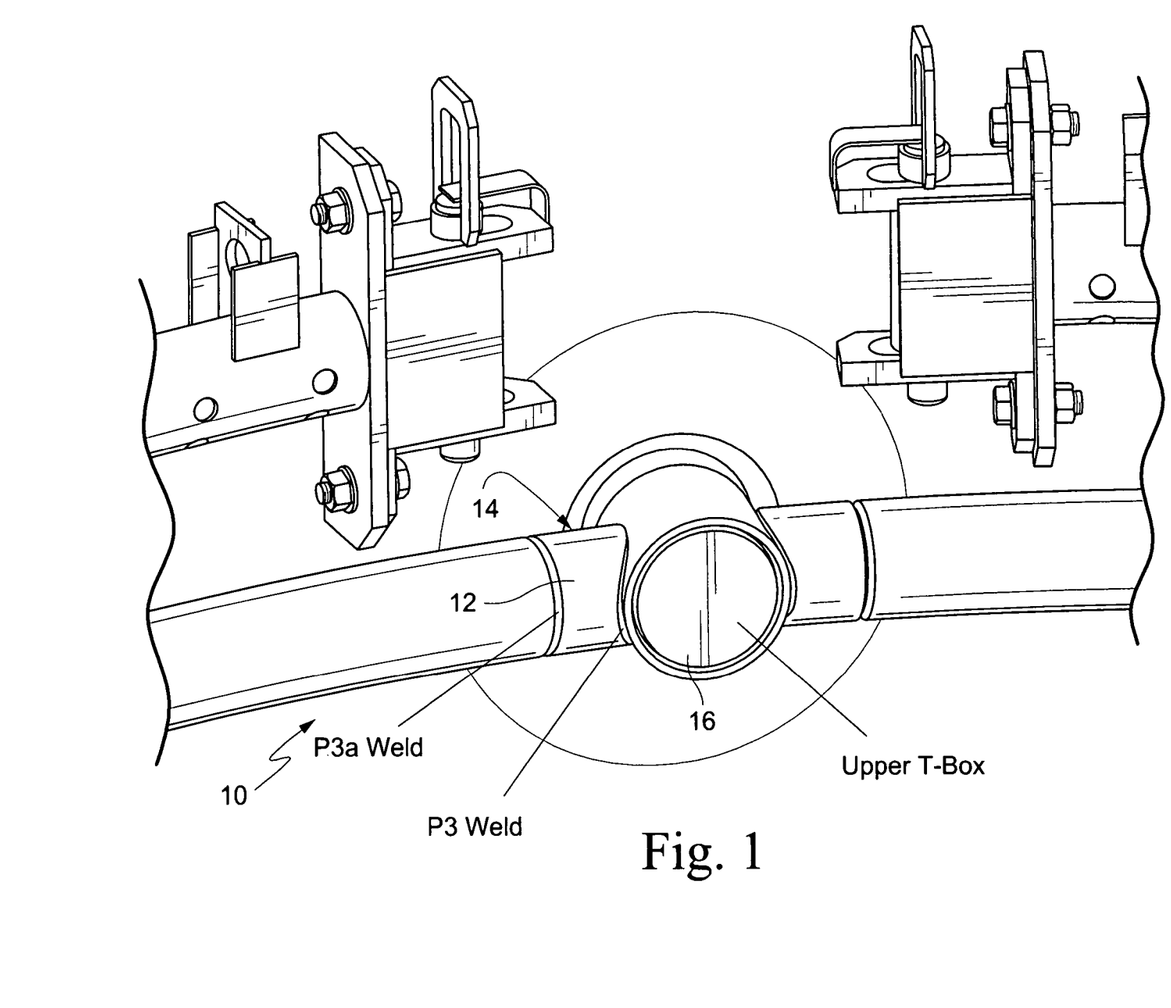
FIG. 1 is an isometric view of a core spray line.

Common to most operating BWR's, the core spray cooling water is delivered to the reactor core region by piping 10 internal to the reactor vessel. A portion of this internal piping is a horizontal segment 12, which is formed to follow the radius of curvature of the reactor vessel wall. The proximal end 14 of the horizontal piping 10 is connected to a T-Box 16 at the core spray nozzle penetration. The piping configuration near the vessel T-Box 16 is shown in FIG. 1.

The core spray piping systems in operating BWR's are of welded construction. The weld connecting the horizontal piping segment 12 to the T-Box 16 is designated as the P3 weld. The distal end of the horizontal core spray line 10 is welded to a short radius elbow. This weld joining the distal end of the core spray line 10 to the short radius elbow is designated as the P4a weld. In at least one BWR, there is another weld in the core spray line 10 in close proximity to the T-Box 16. This weld is designated as the P3a weld.

The welds in core spray system piping are susceptible to Intergranular Stress Corrosion Cracking (IGSCC). In the event that cracking should occur in the P3a weld, the structural integrity of the core spray line 10, which delivers cooling water to the reactor core, would be lost. A preemptive repair would be to design, fabricate, and install a hardware device that would prevent separation of the P3a weld in the event that circumferential through-wall cracking should occur at this weld location in the core spray line.

BRIEF DESCRIPTION OF THE INVENTION

In an exemplary embodiment of the invention, a clamping device for supporting or structurally replacing a cracked weld joint between connected pipes comprises an upper clamp body including an upper curved jaw, a lower clamp body including a lower curved jaw, at least one clamp bolt and at least one clamp bolt keeper nut joined together to connect the upper and lower clamp bodies together and thereby secure the upper and lower curved jaws on opposite sides of the connected pipes in facing relation, the at least one clamp bolt extending through portions of the connected upper and lower clamp bodies other than the upper and lower curved jaws, at least one stop bolt inserted into the upper curved jaw of the upper clamp body, the at least one stop bolt being seated in a hole machined in the connected pipes, and at least one stop bolt keeper corresponding to the at least one stop bolt, the at least one stop bolt keeper being located on the upper curved jaw of the upper clamp body, the at least one stop bolt including having a shape that interfaces with a complementary shape of the at least one stop bolt keeper so as to prevent rotation of the at least one stop bolt and thereby retain a preload on the at least one stop bolt.

In another exemplary embodiment of the invention, a clamping device for supporting or structurally replacing a cracked weld between connected pipes in a core spray line in close proximity to a T-box in a boiling water nuclear reactor comprises an upper clamp body including an upper curved jaw, a lower clamp body including a lower curved jaw, the upper and lower clamp bodies each including a trimmed section adjacent to the T-box to ensure clearance of the upper and lower trim bodies from the T-box, at least one clamp bolt and at least one clamp bolt keeper nut connecting the upper and lower clamp bodies together so as to secure the upper and lower curved jaws on opposite sides of the core spray line connected pipes in facing relation, the at least one clamp bolt extending through portions of the connected upper and lower clamp bodies other than the upper and lower curved jaws, at least one stop bolt inserted into the upper curved jaw of the upper clamp body, a distal end of the at least one stop bolt seating into a conical hole machined in the spray line connected pipes, and at least one stop bolt keeper corresponding to the at least one stop bolt, the at least one stop bolt including ratchet teeth that interface with corresponding teeth of the at least one stop bolt keeper prevents rotation of the at least one stop bolt to retain a preload on the at least one stop bolt.

In a further exemplary embodiment of the invention, a method of supporting or structurally replacing a cracked weld joint between connected pipes using a clamping device, the clamping device including an upper clamp body and a lower clamp body comprises the steps of forming an upper clamp body including an upper curved jaw, forming a lower clamp body including a lower curved jaw, inserting at least one clamp bolt through portions of the upper and lower clamp bodies other than the upper and lower curved jaws, connecting the upper and lower clamp bodies together by mating the at least one clamp bolt with at least one corresponding clamp bolt keeper nut to thereby secure the upper and lower curved jaws on opposite sides of the connected pipes in facing relation, forming at least one conical hole in the connected pipes in an area encompassing the cracked weld joint, inserting at least one stop bolt into the upper curved jaw of the upper clamp body so that the at least one stop bolt seats into the conical hole formed in the pipe, providing on the upper curved jaw of the upper clamp body at least one stop bolt keeper corresponding to the at least one stop bolt, the at least one stop bolt including having a shape that interfaces with a complementary shape of the at least one stop bolt keeper so as to prevent rotation of the at least one stop bolt and thereby retain a preload on the at least one stop bolt.

DETAILED DESCRIPTION OF THE INVENTION

Figure 2:
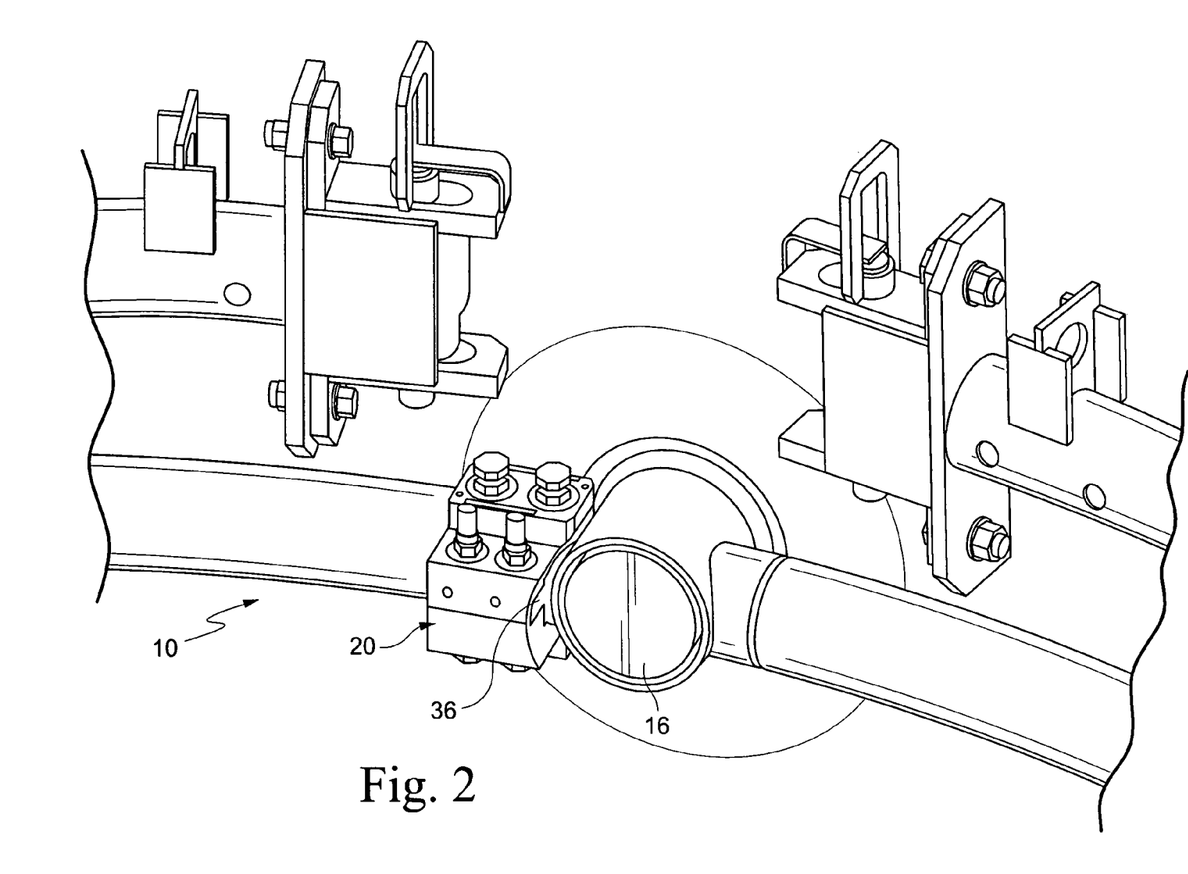
FIG. 2 is a top isometric view of an embodiment of the pipe clamp assembly of the present invention installed over a P3a Weld.

The present invention is directed to a hardware device that can be remotely installed to structurally replace a cracked welded piping joint, such as the P3a weld in a boiling water reactor ("BWR") core spray line shown in FIG. 1. One embodiment of the present invention, shown in FIG. 2, is a pipe clamp assembly or clamping device 20, which structurally replaces a pipe weld, such as the P3a weld. As shown in FIG. 1, the P3a weld joins a short section 12 of horizontal piping to the remainder of horizontal piping in the core spray line 10 of a boiling water reactor. The clamping device 20 is shown in FIG. 2 as being installed on the core spray line 10 over the P3a weld, so as to replace the weld when it has cracked.

The components comprising the pipe clamp assembly 20 are shown in FIGS. 3-8, 10, 11, 13 and 14. The pipe clamp assembly 20 includes an upper clamp body 22 and lower clamp body 24, which are designed to be joined together to engage a portion of a core spray line 10. The design details of the upper and lower clamp bodies 22 and 24 are shown in FIGS. 5 through 8.

The upper clamp body 22 (FIGS. 5 and 6) and the lower clamp body 24 (FIGS. 7 and 8) include an upper block 21 and a lower block 23, respectively, for receiving clamp bolts 30 used to join clamp bodies 22 and 24 together on opposite sides of the core spray line 10 in facing relation to one another.

The blocks 21 and 23 of clamp bodies 22 and 24 include through holes 33 for the insertion of clamp bolts 30 through blocks 21 and 23. Clamp bodies 22 and 24 are clamped in position on the core spray line 10 by virtue of a mechanical tensile force imposed by preferably two clamp bolts 30 that are inserted through holes 33 in blocks 21 and 23 of bodies 22 and 24 and that are held in position by clamp bolt keeper nuts 32 threaded over bolts 30. Both the upper and lower clamp bodies 22 and 24 preferably include spherical seating surfaces 34, which mate with spherical seating surfaces 54 and 52 on the clamp bolt keeper nuts 32 and the clamp bolts 30, respectively. Both upper and lower clamp bodies 22 and 24 are machined uniquely on the side of the respective clamp body nearest the T-Box 16 to provide a clearance gap 36 between such bodies and the core spray T-Box so that the P3 weld will be visible for future inspection. This clearance gap 36 is illustrated in FIG. 2.

Figure 10:
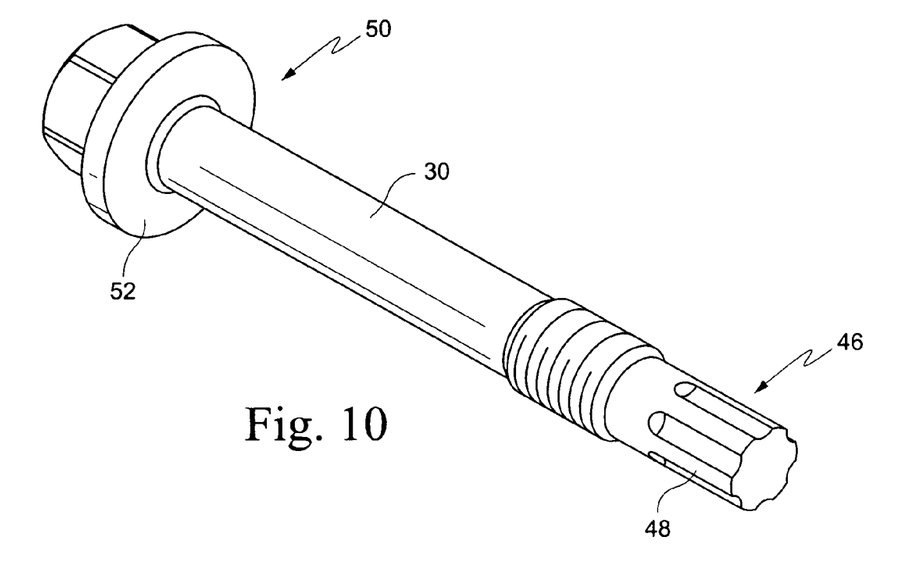
FIG. 10 is an isometric view of a clamp bolt used in the disclosed embodiment of the pipe clamp assembly of the present invention.

An embodiment of the clamp bolt 30 is shown in FIG. 10. The distal end 46 of the clamp bolt 30 is machined to a diameter slightly smaller than the inside diameter of a cylindrical thin-walled crimp collar 56 of the clamp bolt keeper nut 32, and is machined with a plurality of flutes 48 to facilitate crimping of the clamp bolt keeper nut crimp collar 56 onto the distal end 46 of the clamp bolt 30. The proximal end 50 of the clamp bolt 30 incorporates a seating surface 52, which interfaces with the lower clamp body 24.

Figure 11:
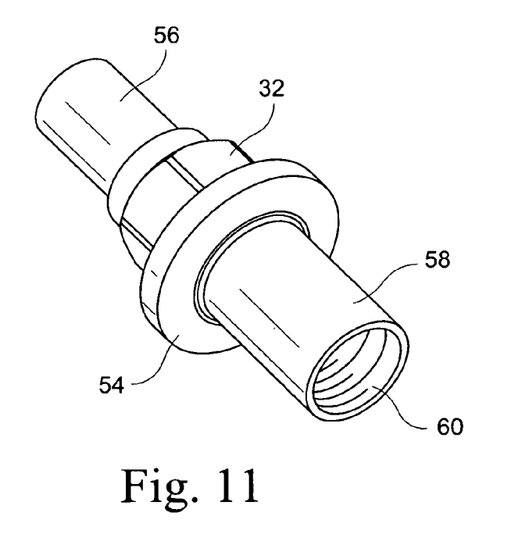
FIG. 11 is an isometric view of a clamp bolt keeper nut used in the disclosed embodiment of the pipe clamp assembly of the present invention.

One embodiment of the clamp bolt keeper nut 32 is shown in FIG. 11. Keeper nut 32 includes a spherical seating surface 54, which interfaces with the upper clamp body 22. Besides crimp collar 56, keeper nut 32 also includes an extension collar 58 with internal threads 60. This threaded extension collar facilitates remote installation of the clamp assembly 20.

Figure 9:
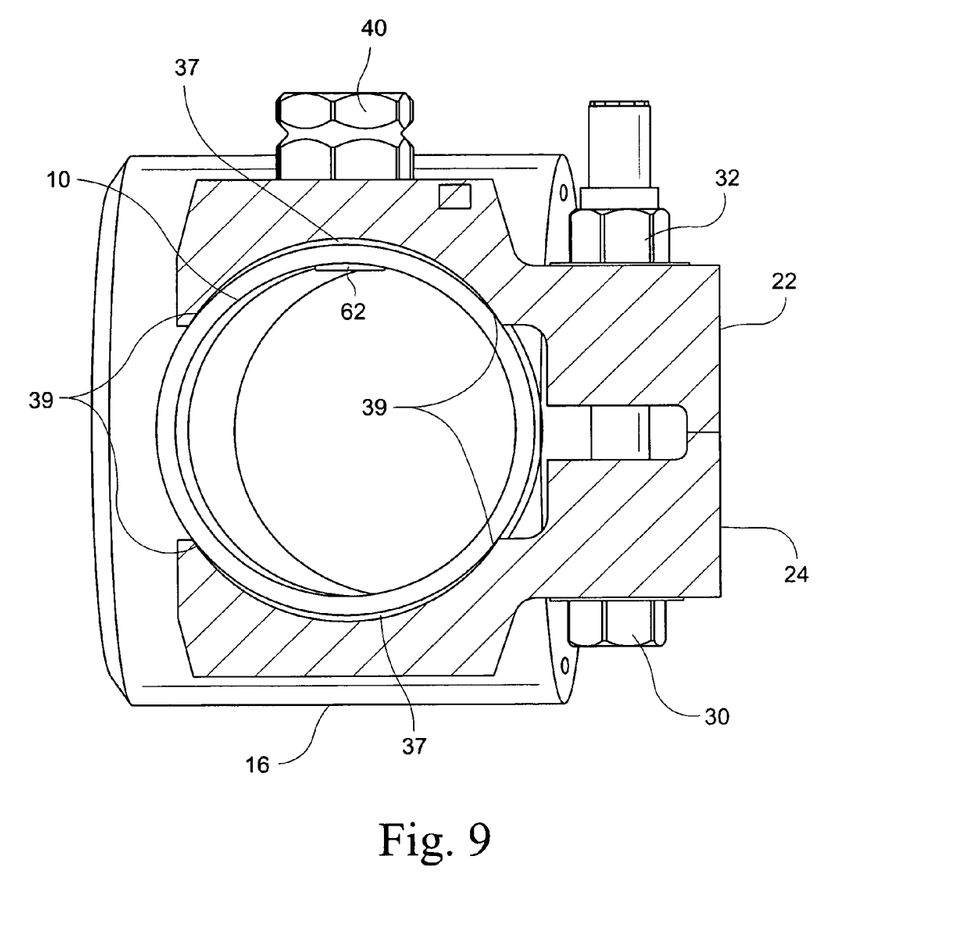
FIG. 9 a cross sectional view of the disclosed embodiment of the pipe clamp assembly of the present invention.

Cantilevered, or otherwise protruding from, upper block 21 and lower block 23 are an upper curved jaw 26 and a lower curved jaw 28, shown respectively, in FIGS. 5-6 and 7-8. Upper and lower curved jaws 26 and 28 have a specified radius of curvature for engaging the core spray line 10. Since the outside diameter of the core spray line 10 can vary within specified manufacturing tolerances, the radius of curvature machined into the upper and lower clamp bodies 22 and 24 is slightly smaller than the nominal radius of curvature of the piping to which such bodies are applied. This slight reduction in radius of curvature ensures that the clamp bodies 22 and 24 will interface with the core spray line 10, as shown in the cross-sectional view of FIG. 9. As shown in FIG. 9, the upper and lower curved jaws 26 and 28 of the upper and lower clamp bodies 22 and 24 contact the core spray line 10 at four contact points 39, so as to form two engineered gaps 37 at points on line 10 between the line 10 and the upper and lower curved jaws 26 and 28. This arrangement prevents the upper clamp body 22 and/or the lower clamp body 24 from rocking on the exterior of the core spray line 10 piping over which they are installed, to thereby ensure that the clamp assembly 20 engages the core spray line 10 piping in a stable manner.

Figure 6:
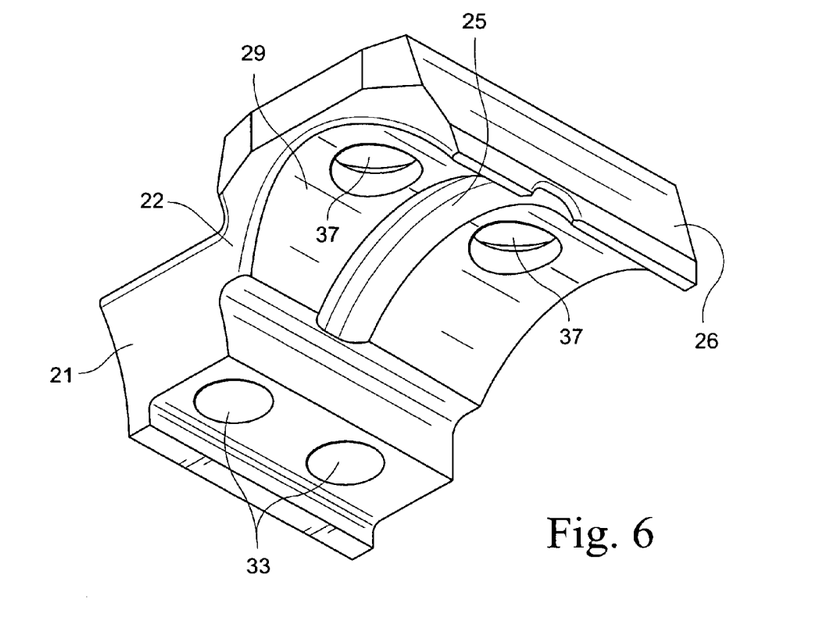
FIG. 6 is a bottom isometric view of the upper clamp body used in the disclosed embodiment of the pipe clamp assembly of the present invention.
Figure 7:
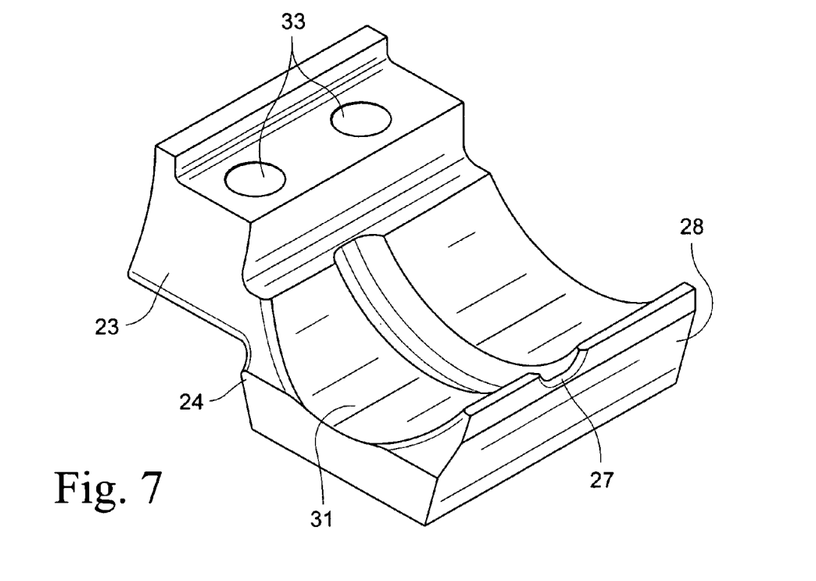
FIG. 7 is a top isometric view of a lower clamp body used in the disclosed embodiment of the pipe clamp assembly of the present invention.
Figure 8:
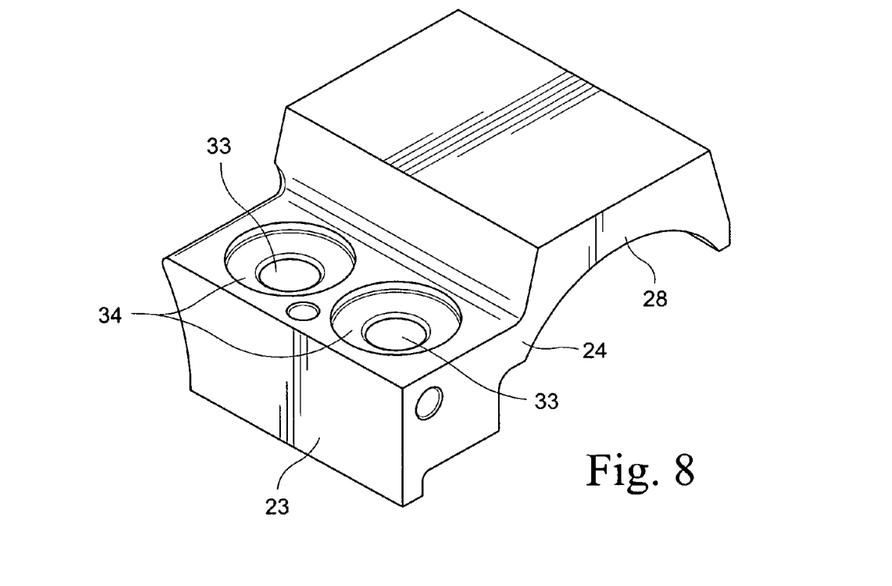
FIG. 8 is a bottom isometric view of the lower clamp body used in the disclosed embodiment of the pipe clamp assembly of the present invention.

Also, the upper and lower curved jaws 26 and 28 of the upper and lower clamp bodies 22 and 24 are machined to ensure clearance with any possible P3a weld crown. As shown in FIGS. 6 and 7, each of the upper and lower curved jaws 26 and 28 of the upper and lower clamp bodies 22 and 24 also has a groove 25 and 27, respectively, machined into a curved surface, 29 and 31, respectively, thereof facing the connected pipes 10, the grooves 25 and 27 being sized to accommodate a weld crown on the connected pipes of the core spray line 10.

Figure 3:
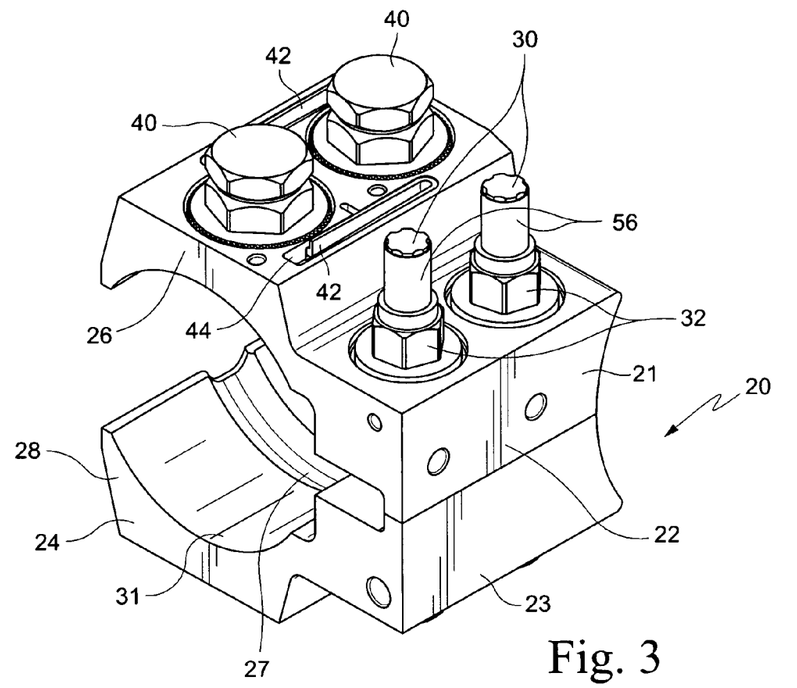
FIG. 3 is a top isometric view of the disclosed embodiment of the pipe clamp assembly of the present invention, fully assembled, but not installed over a cracked weld.
Figure 4:
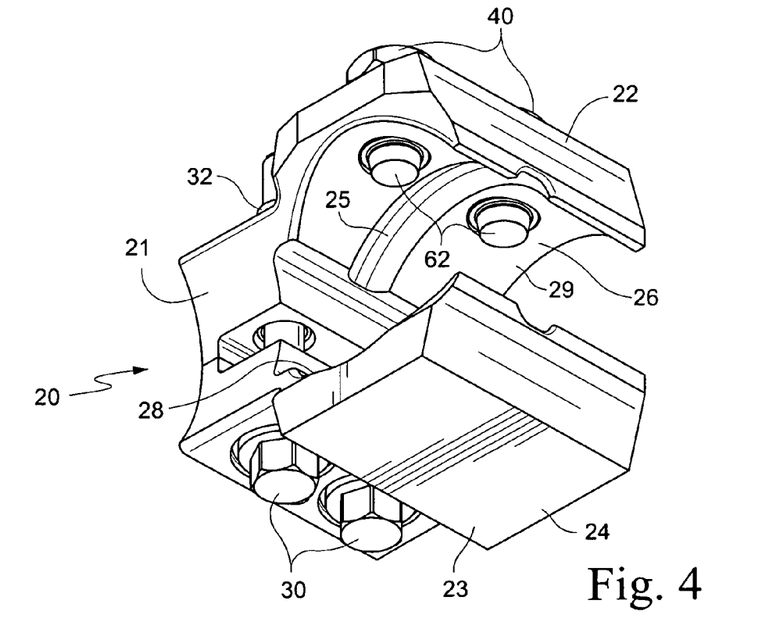
FIG. 4 is a bottom isometric view of the disclosed embodiment of the pipe clamp assembly of the present invention, fully assembled, but not installed over a cracked weld.
Figure 5:
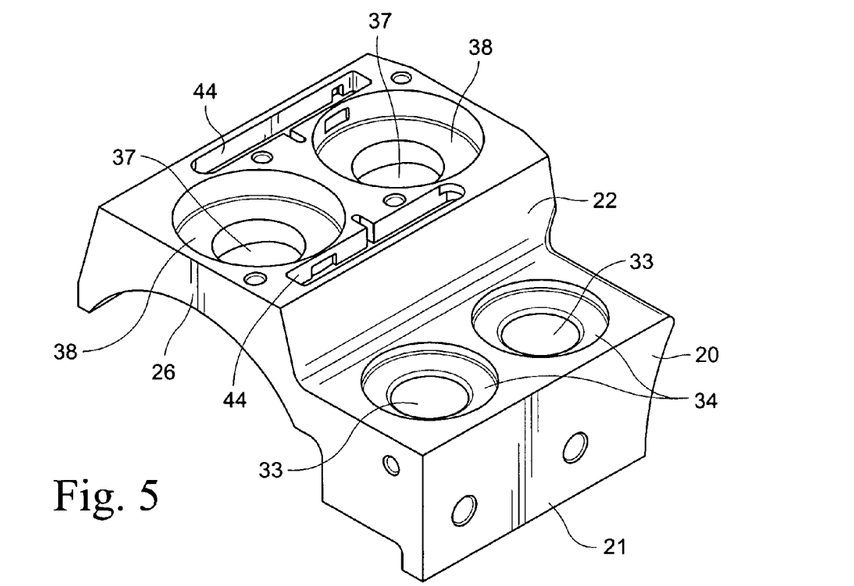
FIG. 5 is a top isometric view of an upper clamp body used in the disclosed embodiment of the pipe clamp assembly of the present invention.
Figure 13:
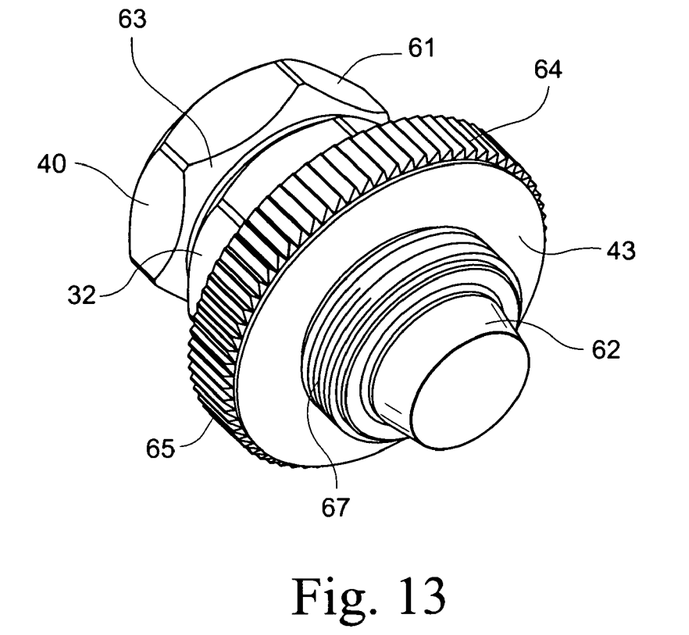
FIG. 13 is an isometric view of a stop bolt used in the pipe clamp assembly of the disclosed embodiment of the pipe clamp assembly of the present invention.

As shown in FIG. 5, the upper curved jaw 26 of upper clamp body 22 also includes two holes 37 through which two stop bolts 40 are inserted, as shown in FIG. 3, to prevent the connected pipes with the cracked weld from separating after the clamp assembly 20 is installed. Machined into jaw 26 are two seating surfaces 38 surrounding holes 37. One embodiment of a stop bolt 40 is illustrated in FIG. 13. Preferably, the stop bolt 40 shown in FIG. 13 includes a hexagonal-shaped head 61 and a middle circular portion 65 with an enlarged diameter and a plurality of ratchet teeth 64 extending around the circumference of the middle circular portion 65. A "V" shaped groove 63 machined into the hexagonal head 61 of each of the stop bolts 40 is a tooling feature designed to facilitate holding of the stop bolts 40 for remote delivery of such bolts into a reactor during installation of clamp assembly 20 onto core spray line 10 piping. Extending from a lower surface 43 of middle circular portion 65 is a threaded shaft 67 with a conical shaped end 62. Threaded shaft 67 facilitates the insertion of the stop bolt 40 into jaw 26.

Figure 16:
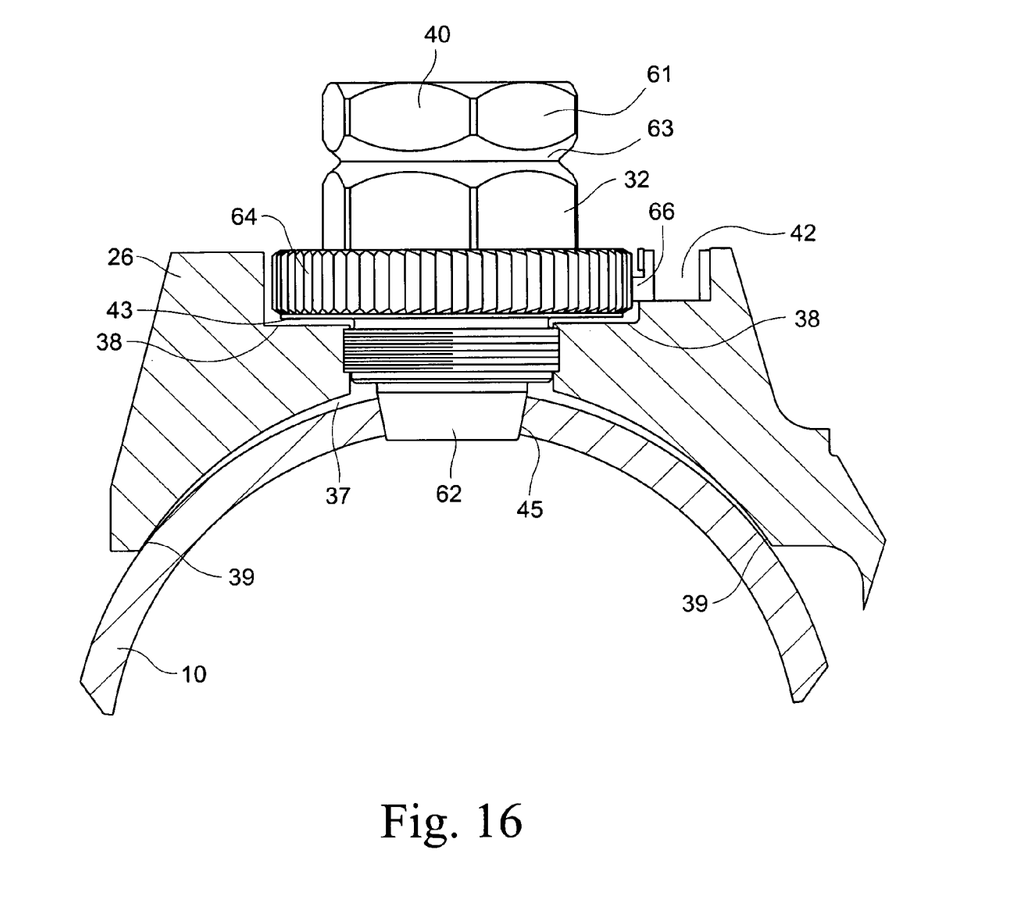
FIG. 16 is a partial cross sectional view showing the interface of the stop bolt with a clamp body used in the disclosed pipe clamp assembly and a hole in the pipe over which the pipe clamp assembly is installed.

As shown in the cross sectional view of FIG. 16, seating surfaces 38 oppose, but do not contact, surfaces 43 on stop bolts 40 when such bolts are threaded into jaw 26 of upper clamp body 22. Surfaces 43 do not contact seating surfaces 38 because, as stop bolts 40 are fully threaded into jaw 26, the conically shaped distal ends 62 of the stop bolts 40 seat into conical holes 45 machined in the core spray line 10.

Upper clamp body 22 also houses preferably two stop bolt keepers 42 (FIG. 14), which are held captive in machined depressions 44 (FIG. 5) in the curved jaw 26 portion of upper clamp body 22. The stop bolt keepers 42 are maintained captive at three separate locations by interfacing features shared by the keepers 42 and the upper clamp body curved jaw 26. The function of the stop bolt keepers 42 is to prevent rotation of the stop bolts 40 once they have been fully threaded into curved jaw 26 of upper clamp body 22, to thereby retain stop bolt preload.

Figure 12:
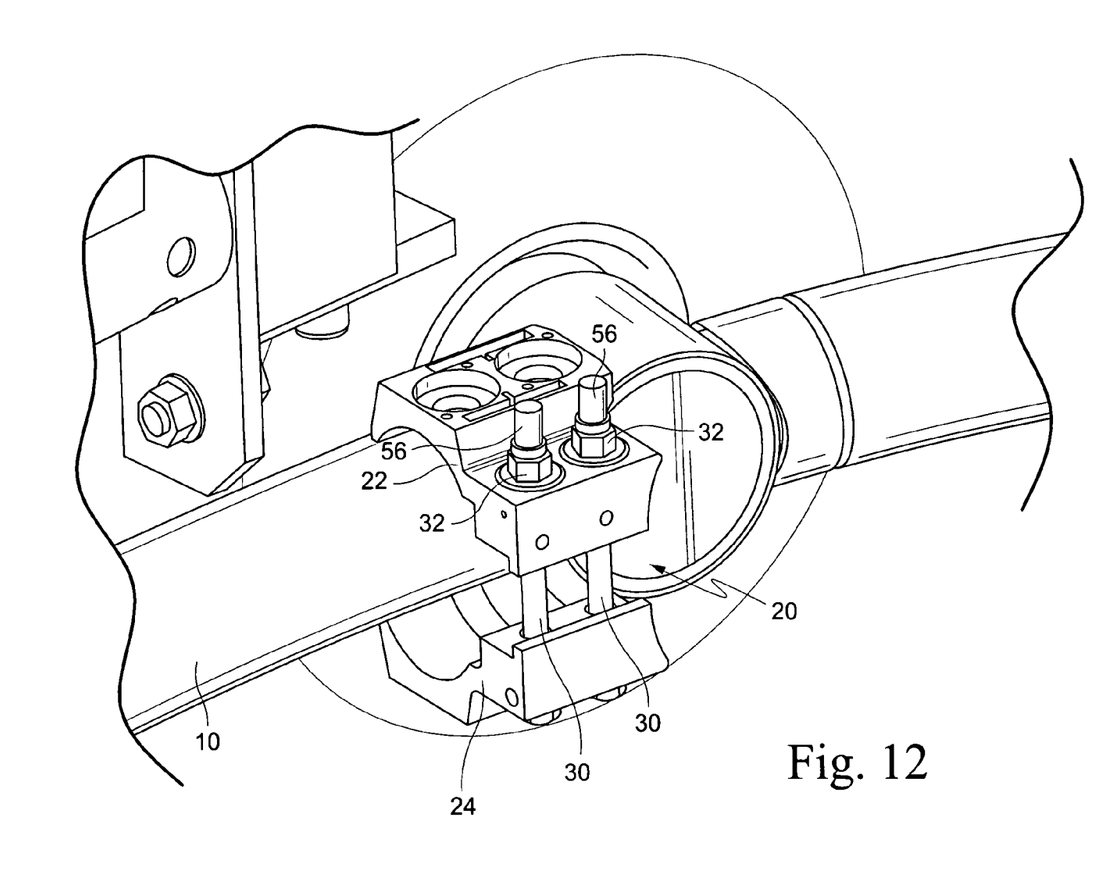
FIG. 12 is an isometric view of an installation configuration for the disclosed embodiment of the pipe clamp assembly of the present invention.

The installation configuration of the pipe clamp assembly 20 is shown in FIG. 12. Once the upper and lower clamp bodies 22 and 24 of pipe clamp assembly 20 are properly positioned onto the core spray line 10 piping, the clamp bolt keeper nuts 32 threaded over bolts 30 are then tightened down, which then draws the upper and lower clamp bodies onto the core spray line 10 piping. Clamp bolts 30 are then preloaded by applying a proper amount of torque to the clamp bolt keeper nuts 32, while preventing rotation of the clamp bolts 30. The threaded extension collar 58 (FIG. 11) of the clamp bolt keeper nut 32 facilitates remote installation of the clamp assembly 20, in that it allows the upper and lower clamp bodies 22 and 24 to be separated sufficiently to pass over the outside diameter of the core spray piping 10 prior to such clamp bodies being bolted together, as shown in FIG. 12. The pipe clamp assembly 20 is then used as a fixture for an electric discharge machining ("EDM") actuator (not shown), to machine conical holes 45 (FIG. 16) into the core spray line 10 piping to a specified depth.

The stop bolts 40 are then threaded into the holes 37 in jaw 26 of upper clamp body 22. Once the stop bolts 40 are fully threaded into jaw 26, the conically shaped distal ends 62 of the stop bolts 40 then seat into the conical holes 45 previously machined into the core spray line 10 piping by the EDM actuator. The ratchet teeth 64 on stop bolts 40 then engage corresponding teeth 66 on the stop bolt keepers 42 to prevent the stop bolts from rotationally moving.

Figure 14:
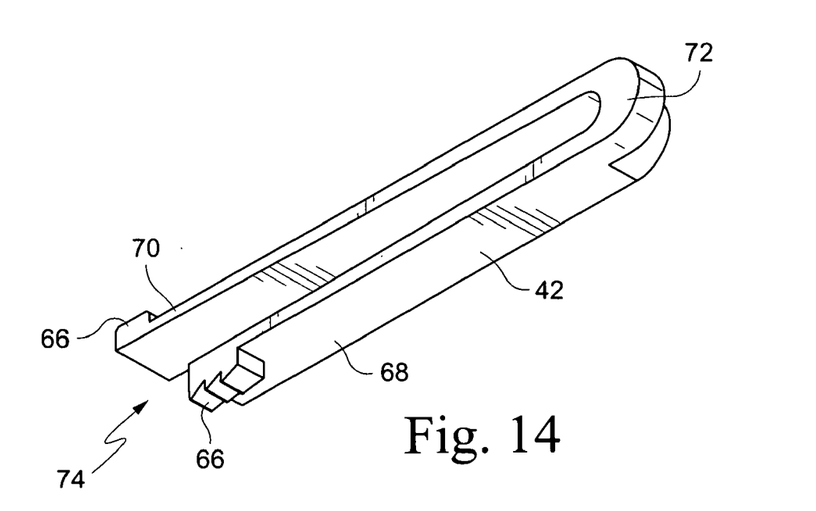
FIG. 14 is an isometric view of a stop bolt keeper used in the disclosed embodiment of the pipe clamp assembly of the present invention.

The embodiment of the stop bolt keeper 42 shown in FIG. 14 is designed to permit only clockwise rotation of the stop bolt 40, and thus prevent loss of preload when subjected to flow induced vibration. The stop bolts 40 are incorporated into the design of the pipe clamp assembly to provide a positive means of preventing pipe separation and the resultant uncontrolled leakage in the event of failure of the P3a weld. As can be seen from FIG. 14, the stop bolt keeper 42 is preferably shaped like a hairpin, which consists of essentially two cantilever beams 68 and 70 joined at one end 72. There are retaining features at the free end 74 of the first and second cantilever beams 68 and 70, and also at the common end 72 where both beams are joined together. In addition, the retaining feature at the end of the first cantilever beam 68 also incorporates teeth 66, which interface with the teeth 64 of the stop bolt 40 and function to prevent rotation of the stop bolt 40 in the direction that decreases bolt preload.

Figure 15:
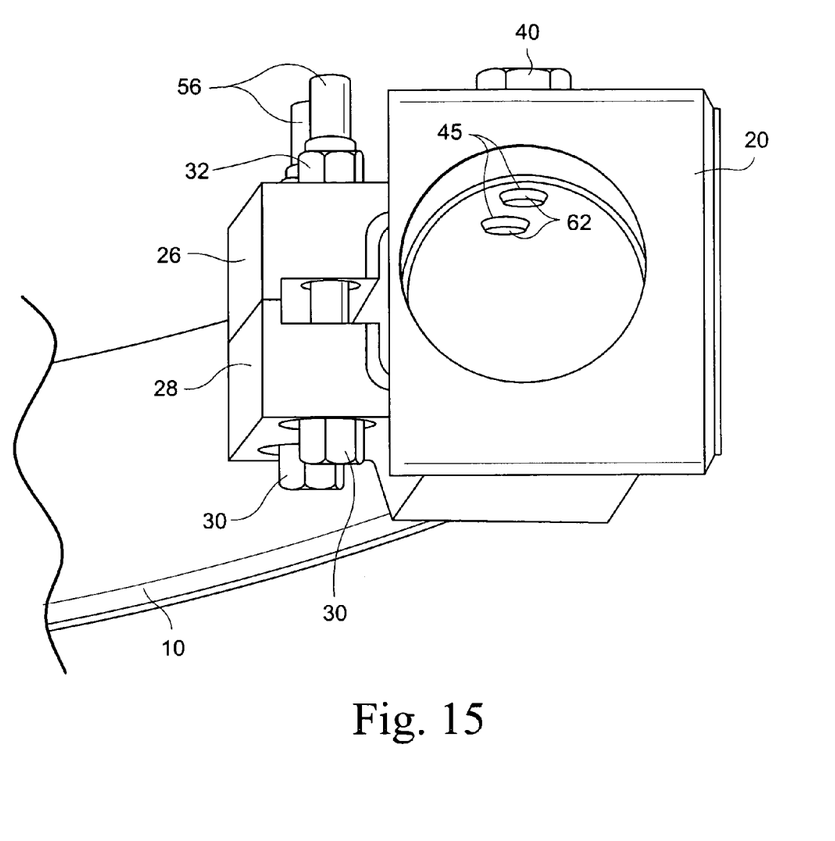
FIG. 15 is another isometric view of the disclosed embodiment of the pipe clamp assembly of the present invention installed over a P3a weld next to a core spray T-box.

Subsequent to installation of the stop bolts 40 and final application of torque to the clamp bolt keeper nuts 32, the crimp collars 56 of the clamp bolt keeper nuts 32 are crimped over the fluted ends 48 of the clamp bolts 30. The completed installation of the pipe clamp assembly 20 is shown in FIG. 15.

It should be noted that the clamp assembly 20 can be used in Boiling Water Reactor plants with varying sized core spray lines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clamping device for supporting or structurally replacing a cracked weld joint between connected pipes, the clamping device comprising:
    an upper clamp body including an upper curved jaw,
    a lower clamp body including a lower curved jaw,
    at least one clamp bolt and at least one clamp bolt keeper nut joined together to connect the upper and lower clamp bodies together and thereby secure the upper and lower curved jaws on opposite sides of the connected pipes in facing relation, the at least one clamp bolt extending through portions of the connected upper and lower clamp bodies other than the upper and lower curved jaws,
    at least one stop bolt inserted into the upper curved jaw of the upper clamp body, the at least one stop bolt being seated in a hole machined in the connected pipes, and
    at least one stop bolt keeper corresponding to the at least one stop bolt, the at least one stop bolt keeper being located on the upper curved jaw of the upper clamp body,
    a portion of the at least one stop bolt engaging a complementary portion of the at least one stop bolt keeper so as to prevent rotation of the at least one stop bolt and thereby retain a preload on the at least one stop bolt.

2. The clamping device of claim 1, wherein the upper and lower curved jaws have a predetermined radius of curvature for engaging the connected pipes that is slightly smaller than a nominal radius of curvature of the connected pipes to which the upper and lower curved jaws are applied.

3. The clamping device of claim 2, wherein the predetermined radius of curvature of the upper and lower curved jaws relative to the nominal radius of curvature of the connected pipes causes each of the upper and lower curved jaws to contact the connected pipes at a plurality of contact points so as to form a plurality of gaps between the connected pipes and the upper and lower curved jaws to thereby ensure that the clamping device engages the connected pipes in a stable manner.

4. The clamping device of claim 1, wherein the at least one clamp bolt keeper nut is threaded over the at least one clamp bolt so as to cause the upper and lower curved jaws to be clamped in position on the connected pipes by virtue of a mechanical tensile force imposed by the at least one clamp bolt being held in position through the upper and lower clamp bodies by the at least one clamp bolt keeper nut.

5. The clamping device of claim 1, wherein a distal end of the at least one clamp bolt is machined to an outside diameter slightly smaller than an inside diameter of a crimp collar of the at least one clamp bolt keeper nut and is machined with a plurality of flutes to facilitate crimping of the at least one clamp bolt keeper nut crimp collar onto the distal end of the at least one clamp bolt.

6. The clamping device of claim 5, wherein the at least one clamp bolt keeper nut crimp collar has a wall thickness that facilitates crimping of the at least one clamp bolt keeper nut crimp collar onto the distal end of the at least one clamp bolt.

7. The clamping device of claim 5, wherein the at least one clamp bolt keeper nut includes an extension collar with internal threads, the threaded extension collar facilitating remote installation of the clamping device over the connected pipes by allowing the upper and lower clamp bodies to be separated sufficiently to pass over the outside diameter of the connected pipes and then clamped together by the at least one clamp bolt keeper nut being threaded onto the at least one clamp bolt.

8. The clamping device of claim 1, wherein the at least one stop bolt keeper is shaped like a hairpin consisting of two cantilever beams joined at one end, and wherein the complementary portions are a plurality of teeth at the distal ends of the two cantilevered beams engaging a plurality of ratchet teeth on a mid portion of the at least one stop bolt.

9. The clamping device of claim 4, wherein a plurality of clamp bolts connect the upper and lower clamp bodies together, and wherein a corresponding plurality of clamp bolt keeper nuts are threaded over the plurality of clamp bolts to secure the upper and lower curved jaws on opposite sides of the connected pipes.

10. The clamping device of claim 4, wherein the upper and lower clamp bodies further comprise upper and lower blocks that receive the at least one clamp bolt, and wherein the upper and lower blocks include spherical seating surfaces that mate with at least one complimentary-shaped spherical head of the at least one clamp bolt and with at least one complimentary-shaped spherical nut that is part of the at least one clamp bolt keeper nut.

11. A clamping device according to claim 8, wherein the upper curved jaw of the upper clamp body includes at least one hole through which the at least one stop bolt is inserted, the upper curved jaw including a seating surface that opposes, but is not contacted by, a lower surface of the mid portion of the at least one stop bolt when the at least one stop bolt is fully inserted into the upper curved jaw, the stop bolt having a conically shaped distal end that seats into a corresponding conically shaped hole machined in the connected pipes so as to preclude the seating surface and the lower surface from contacting one another.

12. A clamping device according to claim 8, wherein the plurality of ratchet teeth extend around a perimeter of the mid section of the at least one stop bolt, the ratchet teeth engaging the corresponding teeth on the at least one stop bolt keeper when the stop bolt keeper is received in the at least one slot depression, the corresponding teeth and the ratchet teeth being configured to limit rotation of the at least one stop bolt in a direction that decreases the preload on the at least one stop bolt.

13. A clamping device according to claim 12, wherein the at least one stop bolt includes a hexagonal-shaped head and a "V" shaped groove machined into the hexagonal head that is a tooling feature designed to facilitate holding of the at least one stop bolt for remote delivery of the at least one stop bolt into a reactor during installation of the clamping device onto the connected pipes.

14. A clamping device according to claim 1, wherein each of the upper and lower curved jaws of the upper and lower clamp bodies further comprise a groove on a curved surface thereof facing the connected pipes, the groove being sized to accommodate a weld crown on the connected pipes.

15. A clamping device for supporting or structurally replacing a cracked weld between connected pipes in a core spray line in close proximity to a T-box in a boiling water nuclear reactor, the clamping device comprising:
an upper clamp body including an upper curved jaw,
a lower clamp body including a lower curved jaw,
the upper and lower clamp bodies each including a trimmed section adjacent to the T-box to ensure clearance of the upper and lower trim bodies from the T-box,
at least one clamp bolt and at least one clamp bolt keeper nut connecting the upper and lower clamp bodies together so as to secure the upper and lower curved jaws on opposite sides of the spray line connected pipes in facing relation, the at least one clamp bolt extending through portions of the connected upper and lower clamp bodies other than the upper and lower curved jaws,
at least one stop bolt inserted into the upper curved jaw of the upper clamp body, a distal end of the at least one stop bolt seating into a hole machined in the spray line connected pipes, and
at least one stop bolt keeper corresponding to the at least one stop bolt,
the at least one stop bolt including ratchet teeth that interface with corresponding teeth of the at least one stop bolt keeper prevents rotation of the at least one stop bolt to retain a preload on the at least one stop bolt.

16. The clamping device of claim 15, wherein the upper and lower curved jaws have a predetermined radius of curvature for engaging the connected pipes in a core spray line that is slightly smaller than a nominal radius of curvature of the connected pipes to which the upper and lower curved jaws are applied, the predetermined radius of curvature of the upper and lower curved jaws causing each of the upper and lower curved jaws to contact the connected pipes at a plurality of contact points so as to form a plurality of gaps between the connected pipes and the upper and lower curved jaws to thereby prevent the upper clamp body and/or the lower clamp body from rocking on the exterior of the connected pipes, to thereby ensure that the clamping device engages the connected pipes in a stable manner.

17. The clamping device of claim 14, wherein a distal end of the at least one clamp bolt is machined to an outside diameter slightly smaller than an inside diameter of a cylindrical thin-walled crimp collar of the at least one clamp bolt keeper nut and is machined with a plurality of flutes to facilitate crimping of the crimp collar onto the distal end of the at least one clamp bolt.

18. The clamping device of claim 17, wherein the at least one clamp bolt keeper nut includes an extension collar with internal threads, the threaded extension collar facilitating remote installation of the clamping device over the connected pipes by allowing the upper and lower clamp bodies to be separated sufficiently to pass over the outside diameter of the connected pipes and then clamped together by the at least one clamp bolt keeper nut being threaded onto the at least one clamp bolt.

19. The clamping device of claim 14, wherein the at least one stop bolt keeper is shaped like a hairpin consisting of two cantilever beams joined at one end, each of the two cantilevered beams having a distal end including teeth that interface with ratchet teeth on the at least one stop bolt.

20. A method of supporting or structurally replacing a cracked weld joint between connected pipes using a clamping device, the clamping device including an upper clamp body and a lower clamp body, the method comprising the steps of:
forming an upper clamp body including an upper curved jaw,
forming a lower clamp body including a lower curved jaw,
inserting at least one clamp bolt through portions of the upper and lower clamp bodies other than the upper and lower curved jaws, connecting the upper and lower clamp bodies together by mating the at least one clamp bolt with at least one corresponding clamp bolt keeper nut to thereby secure the upper and lower curved jaws on opposite sides of the connected pipes in facing relation, forming at least one hole in the connected pipes in an area encompassing the cracked weld joint, inserting at least one stop bolt into the upper curved jaw of the upper clamp body so that the at least one stop bolt seats into the hole formed in the pipe, providing on the upper curved jaw of the upper clamp body at least one stop bolt keeper corresponding to the at least one stop bolt, the at least one stop bolt including having a shape that interfaces with a complementary shape of the at least one stop bolt keeper so as to prevent rotation of the at least one stop bolt and thereby retain a preload on the at least one stop bolt.

\* \* \* \* \*

UNITED STATES PATENT AND TRADEMARK OFFICE
CERTIFICATE OF CORRECTION

| | | |
|---|---|---|
| PATENT NO. | : 7,871,111 B2 | Page 1 of 1 |
| APPLICATION NO. | : 12/219035 | |
| DATED | : January 18, 2011 | |
| INVENTOR(S) | : Jensen | |

It is certified that error appears in the above-identified patent and that said Letters Patent is hereby corrected as shown below:

Title page code (57), line 2 of the Abstract, delete "BWRi's" and insert --BWR's--

Signed and Sealed this
Fifteenth Day of March, 2011

David J. Kappos
*Director of the United States Patent and Trademark Office*